United States Patent [19]

Thoese

[11] Patent Number: 4,500,598

[45] Date of Patent: Feb. 19, 1985

[54] DRAFTING FILM

[75] Inventor: Klaus Thoese, Wiesbaden, Fed. Rep. of Germany

[73] Assignee: Hoechst Aktiengesellschaft, Frankfurt am Main, Fed. Rep. of Germany

[21] Appl. No.: 467,907

[22] Filed: Feb. 18, 1983

[30] Foreign Application Priority Data

Feb. 27, 1982 [DE] Fed. Rep. of Germany ....... 3207122

[51] Int. Cl.$^3$ ........................ B32B 27/08; B32B 27/36

[52] U.S. Cl. .................................... 428/331; 428/323; 428/483; 428/913; 428/332; 428/412; 428/513; 428/514; 428/516; 428/518; 428/448; 428/451; 428/452; 428/522; 428/510; 428/340; 428/702

[58] Field of Search ............... 428/323, 219, 331, 483, 428/332, 913, 340, 520, 448, 522

[56] References Cited

U.S. PATENT DOCUMENTS

| | | | |
|---|---|---|---|
| T948,006 | 7/1976 | Ealding | 428/515 |
| 3,396,046 | 8/1968 | Landau | 106/287 |
| 3,515,626 | 6/1970 | Duffield | 428/331 X |
| 3,607,374 | 9/1971 | Selbel | 428/520 X |
| 3,839,253 | 10/1974 | Kershaw et al. | 428/331 X |
| 3,857,729 | 12/1974 | Burwasser | 117/73 |
| 3,870,549 | 3/1975 | Ruygrok | 117/73 |
| 4,242,396 | 12/1980 | Wilson et al. | 428/331 X |

FOREIGN PATENT DOCUMENTS

| | | | |
|---|---|---|---|
| 1059073 | 2/1967 | United Kingdom | 428/910 |
| 1061784 | 3/1967 | United Kingdom . | |
| 1127076 | 9/1968 | United Kingdom . | |
| 1231407 | 5/1971 | United Kingdom . | |
| 1448889 | 9/1976 | United Kingdom . | |
| 1497657 | 1/1978 | United Kingdom . | |
| 1500134 | 2/1978 | United Kingdom . | |

*Primary Examiner*—Patricia C. Ives

*Attorney, Agent, or Firm*—Schwartz, Jeffery, Schwaab, Mack, Blumenthal & Koch

[57] ABSTRACT

Disclosed is a drafting film which comprises a plastic base provided on at least one surface with an adhesive layer and a pigmented coating system which comprises a pigmented layer and a top layer or a pigmented layer alone. In particular, the pigmented coating system comprises an acrylate or methacrylate copolymer comprising at least 50 percent by weight of an ester monomer, the alcohol component of which has a chain length of at least four carbon atoms, an antistatic agent comprising a polymeric sulfonic acid salt in combination with homopolymers or copolymers of vinyl acetate, or partially hydrolyzed polyvinyl acetate, cross-linking agents and delusterants. Also disclosed is the use of the drafting film for producing diazo sensitized film.

17 Claims, No Drawings

DRAFTING FILM

BACKGROUND OF THE INVENTION

The present invention relates to a drafting film which includes a plastic base which is provided on at least one surface with an adhesive layer and with a pigmented coating system which comprises a homopolymer or copolymer of vinyl acetate or a partially hydrolyzed polyvinyl acetate, hydrophobic polymeric compounds, and delusterants or pigments. Also, the invention relates to the use of the drafting film in preparing a diazo sensitized material.

A drafting film is, as a rule, made from a cellulose acetate, polyvinyl chloride, polypropylene or, preferably, polyethylene terphthalate film which has an adhesive layer on at least one surface. The film is coated with a pigmented coating system, to give a surface which can be marked or written on with pencils and inks. The pigmented coating system consists either of a pigmented layer to which even lines of aqueous drawing inks adhere or a separate top layer is applied to the pigmented layer in order to make India ink adhere.

There is described in German Offenlegungsschrift No. 2,417,879 a film material which can be marked and which contains a top layer applied to a pigmented layer, which consists of a homopolymer of vinyl acetate, a polymeric compound which mainly contains hydroxyl- or carboxyl-containing monomers, and a hydrophobic agent. Such a top layer has, in principle, proven water- or moisture-sensitive. If the hydrophobic agent content is high, wetting with aqueous drawing inks is also unsatisfactory. Finally, this film material lacks an antistatic finish.

Further, German Offenlegungsschrift No. 2,347,324 describes a top layer for a matt film material which can be marked and which contains an external layer as an antistatic coating on a polyester carrier which is provided with a layer of film-forming cellulose lacquer on at least one surface. The antistatic agents used are water-soluble, relatively complex compounds of sulfonated polystyrene and cycloaliphatic amine salt of an alcohol sulfate in which at least one alicyclic radical having at least 5 carbon atoms is bonded to the amine nitrogen atom. The alcohol radical of the alcohol sulfate contains at least five carbon atoms, and the compound comprises a total of at least twelve carbon atoms. Such a layer exhibits disadvantageous sensitivity to humidity, and can always be dissolved from the surface by means of water.

Further, German Offenlegungsschrift No. 2,342,601 describes a matt film material which accepts ink symbols and which contains a first coating of a matt, film-forming cellulose lacquer composition on at least one surface, and is provided with a second coating which consists of an alkyl monoester of polyalkyl vinyl ether maleic acid). Such a coating must be applied from a solution containing an organic solvent. Also, the top layers are relatively thick, so that they tend to become tacky at an elevated temperature. Also, there is no antistatic finish whatsoever.

Furthermore, a transparent drawing material is disclosed in British Pat. No. 1,231,407. The material has a base of polyester film and a drawing layer which contains silica and/or aluminum silicate as pigment and a hardened mixture of polyvinyl alcohol, a urea/ or melamine/formaldehyde precondensate and an acrylate copolymer as binder. While the material maintains a good ink line width, it has unsatisfactory wetting with ink, and lacks an antistatic finish, such that the material fails to meet the highest demands.

Finally, British Pat. No. 1,500,134 describes a polyester film which can be printed and marked with ink and which has a very thin layer, applied during the production of the film, of polyvinyl alcohol or of polyvinyl acetate which has been hydrolyzed up to 72 mole per cent, and of a second component which is a wax or a homopolymer or copolymer of acrylic or methacrylic acid, or of their esters, or a homopolymer or copolymer of vinyl acetate. Such a film, unlike a drafting film which, as a rule, can also be marked with pencil, must have a higher coating weight for the purpose of line correction. However, if such a layer is applied in drawing layer thickness, layers are obtained which are highly sensitive to moisture and heat and which are technically unacceptable. In addition, the disclosed layer lacks an antistatic finish.

A further disclosure in German Offenlegungsschrift No. 2,513,422 describes a coated plastic film such as a polyester film which, if appropriate, has applied on top of a substrate layer of acrylic or methacrylic acid copolymer, a layer which consists of an unhydrolyzed or partially hydrolyzed polymer or copolymer of vinyl acetate and a resinous component which is suitable for intramolecular cross-linking. The vinyl acetate copolymer contains 50 mole per cent of vinyl acetate or more, and can contain a very wide variety of compounds as comonomers, such as dialkyl maleate, 2-ethylhexyl acrylate, ethylene, vinyl chloride or a vinyl ester of versatic acid. Such a coated film is said to also be suitable for preparing drafting films provided appropriate additives are incorporated therein. However, no information is provided about a relevant composition.

It is true that the incorporation of finely divided delusterants is likely to modify the film material in such a way that it can be marked, to a certain extent, with pencils, but additives suitable for writing with inks require considerable experimental effort with respect to compatibility and adjustment of the substances relative to one another and with respect to required properties such as the ability of inks to wet the surface in a suitable way, adhesion to the surfaces and correctability of symbols, and the like. This is particularly important with regard to a possible addition of antistatic agents, which, as is known from experience, impair ink-writing properties, on occasion to such an extent that the inks no longer wet.

SUMMARY OF THE INVENTION

It is therefore an object of the present invention to develop a highly durable drafting film which can be written on with pencil and aqueous ink.

Another object of the invention is to provide a highly durable drafting film exhibiting sharp ink lines with high density, and on which the nominal line widths specified for writing with technical pens are adhered to.

Yet another object of the invention is to produce a drafting film such that it is possible to erase lines ghost-free, and such that the adhesion of the layers as well as the adhesion of applied symbols should fulfill high requirements.

Still another object of the invention is to provide a drafting film with an antistatic finish of good wettability with inks and without adversely affecting the necessary resistance of the drafting film to moisture, mechanical stress, and elevated temperatures.

In accomplishing the foregoing objects, there has been provided in accordance with one aspect of the present invention a drafting film, comprising a plastic base, an adhesive layer applied to at least one side of the plastic base, and a pigmented coating system applied to the adhesive layer. The coating system comprises a first component selected from the group consisting of a homopolymer or copolymer of vinyl acetate or a partially hydrolyzed polyvinyl acetate, a second component selected from the group consisting of acrylate or methacrylate copolymer comprising at least about 50% by weight of an ester monomer having at least four carbon atoms in the alcohol component thereof, cross-linking compounds, a delusterant, and an antistatic agent comprising a salt of a polymeric sulfonic acid.

In a preferred embodiment, the pigmented coating system comprises a copolymer of at least about 90% by weight of vinyl acetate and up to about 10% by weight of unsaturated carboxylic acid, the second component comprises at least about 75% by weight of the ester monomer, and the third an antistatic agent.

In a further preferred embodiment, the pigmented coating system comprises a pigmented layer and a top layer.

In accordance with another aspect of the present invention, there is provided a diazo sensitized film comprising the present drafting film and having a layer comprising light-sensitive diazo chemicals applied to one face thereof.

Further objects, features and advantages of the present invention will become apparent to a person skilled in this art from the detailed description of preferred embodiments which follows.

DETAILED DESCRIPTION OF PREFERRED EMBODIMENTS

The pigmented coating system contains an acrylate or methacrylate copolymer which is formed to at least 50% by weight of an ester monomer, the alcohol component of which has a chain length of at least four carbon atoms, and an antistatic agent of the series of salts of polymeric sulfonic acids is present in the pigmented coating system. The pigmented coating system preferably contains an acrylate or methacrylate copolymer which is formed from at least 75% by weight of an ester monomer, its alcohol component having a chain length of at least four carbon atoms, and an antistatic agent of the series of the sodium salts of polymeric sulfonic acids.

The present invention provides a drafting film having advantageous, preferred properties. For example, the bond between the dimensionally stable plastic film and the pigmented coating system is excellent. The writing properties with graphite or plastic pens, and their correctability, are good. The mechanical strength, the thermal stability, and the resistance to moisture or the action of water are equal to the demands made on a good drafting film. The writing properties with aqueous drawing inks are so good that the lines have a high density, i.e. wetting with ink is satisfactory; and the lines are sharp. The line width on writing with technical pens is in accordance with the prescribed width. Furthermore, the ink lines are erased easily and ghost-free. There is no charge build-up on the drawing surface when the drafting film is being handled, i.e., sheets do not attract or adhere to each other. Residues from erasing do not adhere, and dust attraction is markedly reduced.

As previously noted, these advantageous properties result from a drafting film comprising a plastic base having, at least on one surface thereof, an adhesive layer having applied thereto a pigmented coating system which comprises a homopolymer or copolymer of vinyl acetate or a partially hydrolyzed polyvinyl acetate, hydrophobic compounds, and delusterants or pigments.

Plastic bases are those made of polyvinyl chloride, polycarbonate, polystyrene, polysulfone, polyolefin or polyester or cellulose ester. Of particular interest, are films based on polyester, for example, polyethylene terephthalate due to their exellent dimensional stability, which is of particular importance in the present application.

The adhesive layers used are known mixtures, which are described, for example, in British Pat. No. 1,061,784, and consist of a mixture of an aqueous solution of a halogenocarboxylic acid, finely divided silica, and wetting agents, or of mixtures which are described in British Pat. No. 1,127,076.

The pigmented coating system according to the invention comprises in a preferred embodiment a pigmented layer and a top layer. In another embodiment, the coating system comprises only a pigmented layer which effectively combines the components of both the pigmented and top layer.

In the case of the preferred embodiment having both a pigmented layer and top layer, the top layer comprises a copolymer of at least about 90% by weight of vinyl acetate and up to about 10% by weight of unsaturated carboxylic acid and a combination of acrylate or methacrylate copolymer which comprises at least about 75% by weight of an ester monomer, the alcohol component of which has a chain length of at least four carbon atoms, and an antistatic agent. The pigmented layer corresponds to, for example, a formulation disclosed in German Offenlegungsschrift No. 2,417,879.

If the pigmented coating system comprises only one layer, the components of the combination according to the invention are incorporated into this pigmented layer, known, for example from British Pat. No. 1,231,407.

The copolymer of at least 90% by weight of vinyl acetate and at most 10% by weight of unsaturated carboxylic acids comprises, as comonomers for the vinyl acetate, for example, acids such as maleic acid or maleic anhydride, citraconic acid, itaconic acid or crotonic acid. Copolymers which comprise 95% by weight of vinyl acetate are preferable.

The partially hydrolyzed polyvinyl acetate applicable in the present invention comprises up to about 20% by weight of unhydrolyzed vinyl acetate groups in order to achieve a good combination of water-insolubility and hydrophilic characteristics after cross-linking.

Copolymers which are formed to at least about 50, preferably at least about 75% by weight or more by an ester monomer, the alcohol component of which has a chain length of at least four carbon atoms, are used as the acrylate or methacrylate copolymers according to the invention. In this case, alcohol components of four and of eight carbon atoms have been found to be particularly suitable. If this alcohol component has four carbon atoms, it was discovered that, as an additional requirement, the copolymer dispersion itself leads to films which are non-hydrophilic. In the case of the alcohol component having eight carbon atoms, materials have surprisingly been found to be suitable which are normally used for permanently resilient adhesives, for example, copolymers having a high 2-ethylhexyl acrylate content. Copolymers according to the invention have glass transition points within the range between 0° C. and −70° C.

The mixing ratio between the vinyl acetate copolymer and the acrylate or methacrylate copolymer, in the top layer, can be 1:1. However, it has been found that in some cases such a ratio makes the top layer too soft, so that mixtures containing from about 70 to 90% by weight of vinyl acetate copolymer or partially hydrolyzed polyvinyl acetate and from about 10 to 30% by weight of acrylate or methacrylate copolymer are preferably used. Optionally, the pigmented coating system according to the invention comprises a cross-linking agent.

Pigmented layers to be provided with the top layer according to the invention can have the composition disclosed in German Offenlegungsschrift No. 2,347,324. The pigmented layer can also be similar to those disclosed in German Offenlegungsschrift No. 2,417,879, containing polyvinylformal as the polymeric compound, amorphous silica as delusterant and titanium dioxide as pigment.

The pigmented coating system according to the invention contains as antistatic agents compounds of salts, preferably sodium salts, of polymeric sulfonic acids. Acetals of polyvinyl alcohol with butyraldehyde or polystyrene have proved particularly suitable polymers. The antistatic agent is preferably used in about the same weight proportion as the acrylate or methacrylate copolymer.

The thickness range of the top layer according to the invention expressed as weight per unit area, ranges from about 0.1 to 0.3 g/m$^2$. With regard to the embodiment combining the layers, known thickness values of pigmented layers remain unchanged after combination.

The top layers are applied by means of one of the coating methods customary for this purpose. Suitable solvents are mixtures of alcohol and water. The alcohol content in these solvents depends on the solubility of the raw materials, of the desired wetting properties on the surface to be coated, and on the adhesive strength of the substrate.

The top layer of the present film can also include suitable additives, such as fillers, dyestuffs, pigments and cross-linking-assisting agents, such as compounds of metals of main and secondary group IV of the periodic table which are soluble in the solvents used.

In the case where the pigmented coating system is used in the form of one layer, the constituents of the combination according to the invention are added to the composition of a known drawing layer. Thus, for example, the constituents are applied together with hydrolyzed polyvinyl acetates in the form of an aqueous solution to a plastic film bearing adhesion promoter, the proportion of the components according to the invention being at most about 30% by weight, relative to the polyvinyl acetate present. A proportion of antistatic agent above about 20% by weight has not been found to be suitable, because in such a case the resistance of the pigmented layer to humidity, or water, decreases.

The drafting film according to the invention can also be used as a diazo sensitized film if a layer containing light-sensitive diazo chemicals, for example, a layer of diazonium salt and coupling component, stabilizer, and the like, is applied to one face.

The invention will be further illustrated with reference to the following non-limitative examples.

EXAMPLE 1

A base layer utilized was a 75 μm thick film of polyethylene terephthalate which, on both sides, had an adhesive layer of the type disclosed, for example, in British Pat. No. 1,127,076. An approximately 10 μm thick layer of cellulose acetopropionate containing finely divided silica and aluminum silicate as delusterants (pigmented layer) was applied to the adhesive layer. 2.5% by weight strength solutions in equal parts of water and isopropanol were applied in thin top layers to this pigmented layer, and dried. The top layers had a dry weight between 100 and 300 mg/m$^2$.

Table 1 shows, as dispersions, the copolymers which can be used according to the invention. Table 2 relates the results of trials in which the indicated proportions of the copolymers of Table 1 were used combined with a copolymer of 95% by weight of vinyl acetate, which gave a clear solution in the indicated solvent mixture, in the top layer.

The comparative specimen used was a material bearing a top layer which had been prepared from the vinyl acetate copolymer alone.

The line width was tested by means of lines which had been drawn on the surface with TT drawing ink from Rotring and a technical pen for 1.4 mm wide lines. After the ink had dried, the line width was enlarged 29 times and measured in millimeters at several places, and the measured values were averaged. The theoretical value for the line width is 40 to 41 mm. A larger value is evidence of undesirable spreading of the ink lines, while a smaller value indicates low sharpness.

TABLE 1

| Comonomers in polymer | Solids concentration (% by weight) | pH value | Glass transition point of the polymer (Tg in °C.) |
|---|---|---|---|
| Methyl methacrylate containing more than 75% by weight of 2-ethylhexyl acrylate (OACR-I) | 60 | 6.5–8.5 | −65 |
| Copolymer containing more than 75% by weight of 2-ethylhexyl acrylate (OACR-II) | 50 | 4.5–5.5 | −53 |
| Styrene containing more than 50% by weight of 2-ethylhexyl acrylate (S-OACR) | 50 | 8.0 | −8 |
| Styrene containing 50% of butyl acrylate, self-crosslinking (S-BACR-VW) | 45 | 4.5 | −11 |
| Styrene containing more than 50% of butyl acrylate, self-crosslinking (S-BACR-VH) | 50 | 5–7.5 | higher than −11 |

TABLE 2

| Serial Number | Copolymer | Proportion of copolymer in top layer (% by weight) (made up to 100% by the vinyl acetate copolymer VAC) | | | | | |
|---|---|---|---|---|---|---|---|
| | | 0 | 10 | 20 | 25 | 30 | 50 |

TABLE 2-continued

| Serial Number | Copolymer | Proportion of copolymer in top layer (% by weight) (made up to 100% by the vinyl acetate copolymer VAC) | | | | | |
|---|---|---|---|---|---|---|---|
| | | Line widths (mm) in each case | | | | | |
| 0 | | 46 | — | — | — | — | — |
| 1 | OACR-I | — | 41 | 41 | 41 | 40 | 40 |
| 2 | OACR-II | — | — | — | 40 | — | — |
| 3 | S-OACR | — | 42 | 41 | — | 41 | 41 |
| 4 | S-BACR-VW | — | — | — | 41 | — | — |

This table illustrates that when the copolymers are added as dispersions in a proportion of up to 30% the line width of the ink is obtained in the width desired. It is true that proportions of 50% added material also fulfill this requirement, but the layers are made too soft. All samples had good wetting and adhesion. It is also clear that in trial 1 a good effect can be achieved even when only a relatively small amount is added.

EXAMPLE 2

Top layers containing various antistatic compounds were spread on a carrier described in Example 1, which had an adhesive layer and a pigmented layer. For this purpose, 2.5% by weight strength solutions of equal parts of water and isopropanol were prepared, their solids content being 80% of a copolymer containing 95% of vinyl acetate and 20% of a copolymer according to the invention (OACR-I) (solution A). This solution was mixed in a weight ratio of 5:1 with 2.5% by weight strength solutions of the following compounds:

1. Acetal of polyvinyl alcohol with butyraldehydesulfonic acid, as the sodium salt,
2. Sodium salt of carboxymethylcellulose,
3. Polyvinylbenzyltrimethylammonium chloride,
4. Poly-N,N'-dimethyl-3,5-methylenepiperidinium chloride,
5. Sodium polystyrenesulfonate,
6. Lithium polystyrenesulfonate,
7. Polyacrylic acid (sodium salt)
8. Polyacrylic acid (ammonium salt).

The parameters measured were as in Example 1, the width of ink lines, the wetting with TT ink, by inspection of the dried lines with a magnifying lens, and the surface resistance of the top layer at 50% relative humidity and 23°, by means of a spring tongue electrode (set-up A) in accordance with DIN 53,482 or Part 3 of VDE 0303 and a measurement voltage of 100 V.

Solution A is used as the blank.

The solids ratio of the components in the formulations, copolymer containing 95% of vinyl acetate to copolymer according to the invention to antistatic agent, was 66:17:17.

The results of the various tests are compiled in Table 3 which follows.

TABLE 3

| Antistatic Agent | Line Widths (mm) | Wetting with ink | Surface resistance (Ω) |
|---|---|---|---|
| 0 | 40 | good | $10^{14}$ |
| 1 | 41 | good | $1.5 \times 10^{10}$ |
| 2 | 41 | medium to poor | $8 \times 10^{11}$ |
| 3* | | | |
| 4 | 43 | good | $1.1 \times 10^{13}$ |
| 5 | 40 | good | $6.5 \times 10^{9}$ |
| 6 | 41 | good | $4.4 \times 10^{11}$ |
| 7 | 42 | good | $10^{14}$ |
| 8 | 42 | good | $4.4 \times 10^{11}$ |

*Solution A was incompatible with the solution of the antistatic agent.

It is clear that the combinations containing the antistatic agents 1, 5 and 6 had the best results.

EXAMPLE 3

A 75 μm thick polyester film bearing an adhesive layer and a pigmented layer, as described in Example 1, was coated with solutions which contained the antistatic agent 1 and in which the copolymer containing 95% of vinyl acetate (VAC) was combined with the following copolymers according to the invention. The composition in percent by weight was as follows:

| | a | b | c |
|---|---|---|---|
| VAC | 70 | 70 | 60 |
| Copolymer | 20 | 10 | 20 |
| Antistatic Agent 1 | 10 | 20 | 20 |

The results are shown in Table 4. The table also shows the result of the ink adhesion test. In this test, 0.5 mm wide lines were drawn with TT ink, dried in the air, and then tested for adhesion by applying an adhesive strip with the aid of the folding bone and then tearing off the strip in one jerk. In the case of good adhesion, the traces of visible ink on the adhesive strip are minimal. In the case of poor adhesion however, a considerable part of the ink line is removed together with the adhesive strip.

TABLE 4

| | | | Properties of the top layer | | | |
|---|---|---|---|---|---|---|
| Serial No. | Copolymer | Combination | Line Width (mm) | Wetting | Adhesion | Surface resistance (Ω) |
| 1 | OACR-I | a | 42 | good | good | $1.2 \times 10^{11}$ |
| 2 | | b | 43 | medium | medium | $1.5 \times 10^{10}$ |
| 3 | | c | 42 | medium | medium | $1.5 \times 10^{10}$ |
| 4 | S-OACR | a | 44 | good | medium | $6.0 \times 10^{11}$ |
| | | b | 44 | medium | medium | $2.2 \times 10^{10}$ |
| | | c | 43 | medium | medium | $2.7 \times 10^{10}$ |

EXAMPLE 4

A 75 μm thick, commercially available polyester film was provided on one side with an $SiO_2$-containing adhesive layer as described in U.S. Pat. No. 3,396,046. This substrate is coated with aqueous solutions of the pigmented layers as described below in Table 5 and dried in a drying oven at 140° C. for five minutes to obtain layers having a thickness of from about 8 to 10 μm.

The comparison used was a pigmented layer which had been prepared in accordance with Example 2 of British Pat. No. 1,231,407. Specimen A is free of copolymer according to the invention.

TABLE 5

| | A | B |
|---|---|---|
| 10% strength solution of polyvinyl alcohol of which 70% has a K value of 50 and 30% has a K value of 70 | 142 | 137 |
| 30% strength dispersion of silica and aluminum hydroxide in water | 26 | 26 |
| 10% strength solution of tributylglycol polyglycol ether (wetting agent) | 2 | 2 |
| 10% strength solution of melamine/formaldehyde resin | 12 | 12 |
| 5% strength solution of aluminum sulfate | 5 | 5 |
| 30% strength copolymer dispersion | without | 9 S-BACR-VH |
| Water | 10 | 6 |

Formulations C and D were the same as Formulation B except that Formulation C also comprised 9 g of S-BACR-VW and Formulation D comprises 9 g of OACR-I.

Table 6, in addition to test results, also shows how films which have been stored for at least 10 days and then immersed in water for 30 minutes respond to scratching with a fingernail. Good scratch resistance indicates that the film has been efficiently cross-linked, and is therefore largely impervious to the action of water.

TABLE 6

| Serial No. | Formulation | Scratch Resistance | Ink Line Width (mm) | Wetting With Ink |
|---|---|---|---|---|
| 1 | In accordance with Example 2 of British Patent No. 1,231,407 | medium | 42 | poor |
| 2 | (A) | poor | 44 | good |
| 3 | (B) | good | 44 | good |
| 4 | (C) | good | 42 | good |
| 5 | (D) | medium | 42 | good |

EXAMPLE 5

Example 4 was repeated. Antistatic agents 1 and 5 (Example 2) were added to Formulation C (Example 4), in the form of 22% strength solutions and in amounts of 20 g per 200 g of pigmented coating composition.

TABLE 7

| Layer | Surface Resistance (Ω) |
|---|---|
| C | $5.5 \times 10^{12}$ |
| C with antistatic agent 1 | $7.5 \times 10^{11}$ |
| C with antistatic agent 5 | $4.6 \times 10^{11}$ |

The surface resistance was reduced while other properties remained good.

What is claimed is:

1. A drafting film, comprising
a plastic base;
an adhesive layer applied to a least one side of said plastic base; and
a pigmented coating system including a top layer and a pigmented layer applied to said adhesive layer, said top layer comprising:
a first component selected from the group consisting of a homopolymer or copolymer of vinyl acetate;
a second component selected from the group consisting of an acrylate or methacrylate copolymer comprising at least about 50% by weight of an ester monomer having at least four carbon atoms in the alcohol component thereof; and
an antistatic agent comprising a salt of a polymeric sulfonic acid, and
said pigmented layer comprising:
a delusterant, and
a pigmented material, whereby said drafting film can be written on with pencil and with aqueous ink.

2. A drafting film as defined in claim 1, wherein said second component comprises at least about 75% by weight of said ester monomer.

3. A drafting film as defined in claim 1, wherein said first component comprises a copolymer comprising at least about 90% by weight of vinyl acetate and up to about 10% by weight of unsaturated carboxylic acid, and said second component comprises at least about 75% by weight of said ester monomer.

4. A drafting film as defined in claim 3, wherein said unsaturated carboxylic acid is selected from the group comprising maleic acid, maleic anhydride, citraconic acid, itaconic acid or crotonic acid.

5. A drafting film as defined in claim 1, wherein said plastic base comprises a polyester.

6. A drafting film as defined in claim 5, wherein said polymer comprises polyethylene terephthalate.

7. A drafting film as defined in claim 1, wherein said alcohol component of said ester monomer comprises four carbon atoms.

8. A drafting film as defined in claim 1, wherein said alcohol component of said ester monomer comprises eight carbon atoms.

9. A drafting film as defined in claim 1, wherein said second component comprises 2-ethylhexyl acrylate.

10. A drafting film as defined in claim 1, wherein said copolymer of said second component has a glass transition point in the range of from about −70° C.-0° C.

11. A drafting film as defined in claim 1, wherein the mixing ratio between said first and second components ranges from about 70 to 90% by weight of said first component and from about 10 to 30% by weight of said second component.

12. A drafting film defined in claim 1, wherein the coating system comprises a cross-linking compound.

13. A drafting film as defined in claim 1, wherein said antistatic agent comprises a sodium salt of a polymeric sulfonic acid.

14. A drafting film as defined in claim 1, wherein the thickness of said top layer ranges from about 0.1 to about 0.3 g/m$^2$.

15. A diazo sensitized film comprising the drafting film as defined in claim 1 having a layer comprising light-sensitive diazo chemicals applied to one face thereof.

16. A drafting film as defined in claim 1, wherein said first component comprises a copolymer comprising at least about 90% by weight of vinyl acetate and up to about 10% by weight of unsaturated carboxylic acid.

17. A drafting film as defined in claim 16, wherein said first component comprises a copolymer comprising at least about 95% by weight of vinyl acetate.

* * * * *